UNITED STATES PATENT OFFICE.

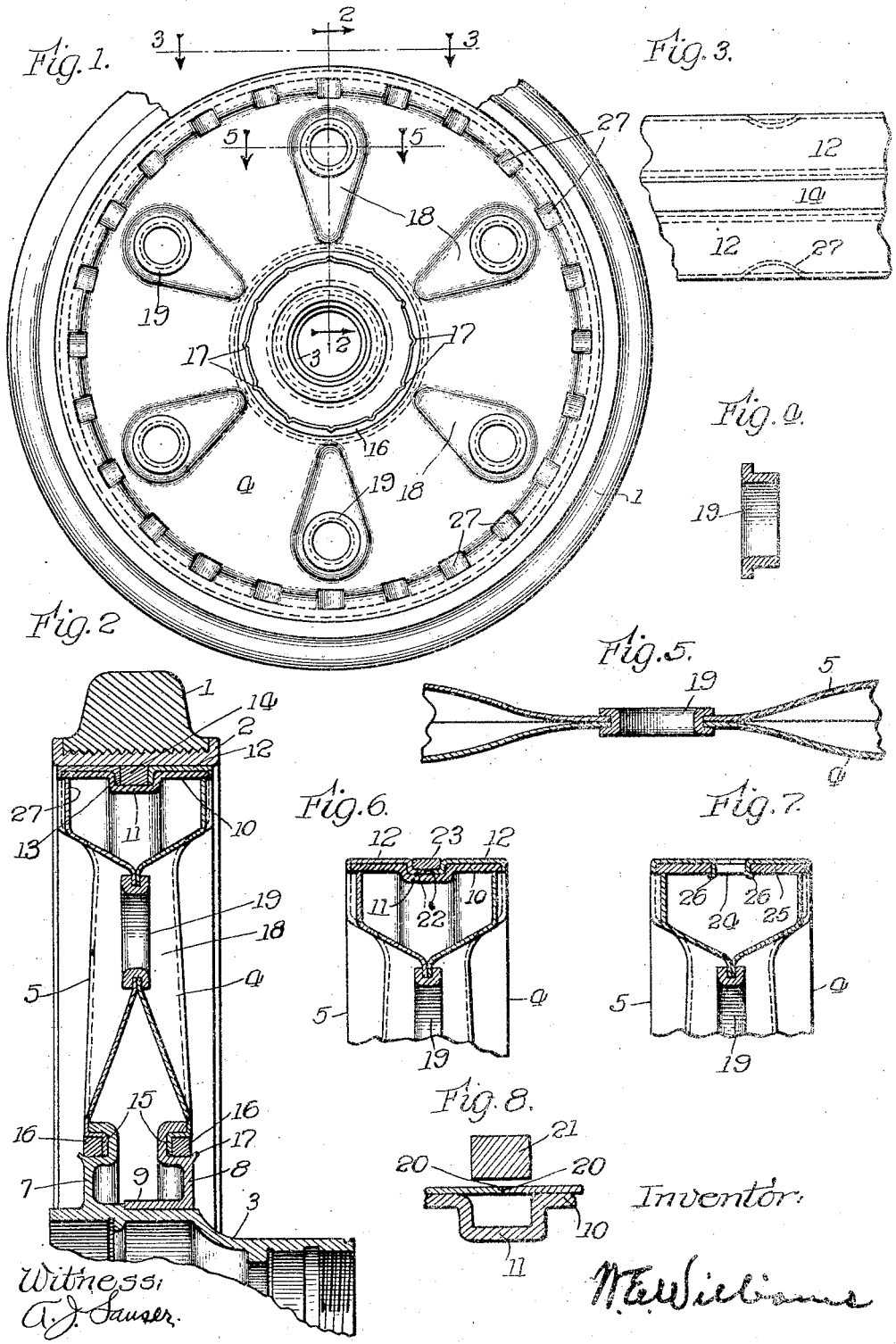

WILLIAM ERASTUS WILLIAMS, OF CHICAGO, ILLINOIS.

FLANGED DISK PRESSED STEEL WHEEL.

1,392,381. Specification of Letters Patent. Patented Oct. 4, 1921.

Application filed September 13, 1919. Serial No. 323,524.

*To all whom it may concern:*

Be it known that I, WILLIAM ERASTUS WILLIAMS, a citizen of the United States, resident of Chicago, county of Cook, and State of Illinois, have invented a new and useful Improvement in Flanged Disk Pressed Steel Wheels, of which the following is a specification.

The object of my invention is to provide a light, cheaply constructed strong and durable wheel.

Reference will be had to the accompanying drawings, in which Figure 1 is a front elevation of the wheel. Fig. 2 is a vertical sectional elevation of the wheel on line 2—2 of Fig. 1. Fig. 3 is a top plan view of the edge of the rim as indicated by the arrows 3—3 in Fig. 1. Fig. 4 is a detail of a thimble used for assisting in fastening the plates together. Fig. 5 is a sectional detail on line 5—5 of Fig. 1. Fig. 6 is a transverse section through the rim of the wheel, showing an alternative construction. Fig. 7 is a similar view to that of Fig. 6, showing another alternative construction. Fig. 8 is a detail showing the steps required to secure the rim parts together.

My wheel is intended chiefly for use with automobiles, particularly with automobile trucks, although it may be used for pleasure cars or passenger cars.

For illustration, a solid tire is shown on a suitable tread, but different tires and treads may be used.

In the drawing 1 indicates the solid rubber tread of a truck tire and 2 a steel base to which the tire is fixed. 3 indicates the ordinary hub of a truck wheel.

Preferably this wheel has instead of spokes two similar but oppositely turned disks, 4, 5, and a hub 3 having a not necessarily integral flange 7 and a distinct front flange member 8 provided with a ring 9 fitting over the hub and pressed on so tightly as to be practically non-removable.

The wheel rim has an annular band 10 provided with a medial circumferential groove 11 between cylindrical marginal flanges. The disks 4, 5 rest against the lateral edges of the band 10, are sharply bent over its peripheral face and again sharply bent, at 13, into the groove 11 where they are held by a ring 14 pressed to the groove, thus securely binding the disks in the latter.

The rim of the wheel is made with an annular band 10, which is formed with an inward extending recess 11, thus making the section what might be termed a channel section with horizontal flanges on its margins.

The plates 4 and 5 are flanged over at their outer margins 12 to embrace the rim piece 10 and they have their inner ends turned in at 13 into the groove 11 of the rim 10. A bar 14 that is welded into a complete ring, is pressed into the groove 11, binding the ends 13 in a tight lateral fit into the groove 11, thus making a positive lock of the several parts together. When the wheel is fabricated the disks 4 and 5, where they join the hub, are each pressed into a groove 15 of the flanges 7 and 8 and are secured in the said grooves by rings 16 which are of the right sizes to make a snug fit and fix the inner portion of the plates 4 and 5 so tightly into the grooves 15 of the flanges 7 and 8 as to hold the metal of the sheets so that the plates will tear outside of the groove without loosening this fastening.

After the rings 16 are pressed home into the grooves 15 a small flange 17 primarily in position to allow the corresponding ring 16 to pass to place is bent over to the position shown in the drawing.

In forming the disks 4, 5, portions 18 are pressed outward and in the bottoms of the recesses so formed holes are punched to receive disk-connecting eyelets 19 which when riveted in place rigidly connect these parts of the disks.

In fabricating the wheel the steps are as follows:—

The two plates 4 and 5 are pressed in suitable dies and with their edges 13 as they appear in the assembled wheel, extending out straight as shown at 20 in Fig. 8. Then one of the plates is assembled in relation to the hub flange 7 and is secured to that flange by being pressed in by means of the ring fastening 16 as before described. The other disk 4 is then secured to the flange 8 and fastened thereto by the fastening ring 16, before the said flange 8 is assembled on the hub. Then the flange 8 and plate 4 become, as it were, a unitary piece, so also does the plate 5 and the flange 7 become a unitary piece with the hub. Then the parts are placed in relationship with the rim piece 10 and the hub, and pressed together, the pressing operation pressing on the flange 8 at the same time that the margins of the disks or plates are made to press over the rim 10.

When the parts are thus pressed together the eyelets 19 are inserted and riveted over and thus fastening the plates together at the eyelet holes. The next step involves the turning in of the ends 20, Fig. 8, from their straight position to the position shown in the assembled views, which is done by spinning, rolling or pressing.

The ring 14 may be secured in place by suitable methods, for example: by making it of large diameter, passing it to the position shown at 21, Fig. 8, and then upsetting it to decrease its diameter until it is fully home in the groove; or by using a cold shut ring and welding its ends together after it is pressed home; or by using a divided ring and fixing it in place by screws or rivets; or by simply pressing a divided ring home by such heavy pressure that no special fastening is necessary.

Fig. 6 shows an alternative construction which differs from Fig. 2 only in the fact that the inner ends 13 of the flanges 12 of the disks 4 and 5 are bent under the binding ring as is indicated by 22 for the ends of the flanges, and 23 for the ring, and thus this ring may be thinner than it is shown in Fig. 2.

The alternative construction shown in Fig. 7 differs from that of Fig. 2 and Fig. 6 by the fact that instead of the channeled groove 11 in the rim 10 I punch holes 24 at intervals in a straight rim 25, but I punch only a small number of these holes in the total circumference of the rim, in order not to too seriously weaken the rim. Then into these holes I turn the ends 26 of the flanges of the plate as indicated in Fig. 7, thus binding the rim and disks together on the tread of the rim of the wheel.

The purpose of turning over the flanges 12 as indicated, besides giving a firm position for the disks to act as strut members in sustaining the load, is to fasten the margins of the plates or disks 4 and 5 to the rim of the wheel so securely as to make the wheel a tension wheel as well as a strut wheel or a wheel adapted, like wheels having heavy, compression resisting spokes, to carry the load on spokes below the axle.

At intervals around the margins of the wheel are formed little depressions, indicated by 27, Fig. 3, which are cut loose from the main body of the plate, laterally and at their outer ends, to form lugs which are forced tightly against the inner side of the rim 10 and thus become positive thrust members acting against the rim 10, somewhat in the manner of spokes against a felly, thus joining the rim members together in such manner that the wheel is a rigid unitary structure adapted to support a load by resisting both compression strains below the axle and tension strains above the axle.

What I claim is:—

1. In a wheel of the class described, a hub having a circumferential flange parallel to the general plane of the wheel and provided with an annular lateral groove of approximately rectangular cross section adapted to receive the inwardly bent marginal portion of a wheel disk, and a ring forced into and laterally filling the remaining space between the opposite walls of the groove.

2. The combination with a hub having a rigidly connected plane circumferential flange provided with a lateral annular groove adapted to hold primarily by friction alone members forced into the groove, of a wheel disk having its margin bent laterally into the groove, a ring forced into the groove alongside the inserted portion of the disk, and an integral member projecting alongside the groove and adapted to be bent over said ring.

3. The combination with a hub having spaced circumferential flanges each provided with a lateral annular groove of wheel disks bent laterally into the grooves, respectively, and rings forced into the grooves, respectively, and each pressing a disk against one groove wall while itself reacting against the opposite wall.

4. The method of forming a disk wheel which consists in providing a tread ring and hub provided with circumferential flanges adapted to receive lateral disk-flanges, further providing disks having on one face a flange to engage the hub, a flange to pass over the tread ring, and lugs to fit within the tread ring, arranging the parts in proper sequence, and pressing all the parts perpendicularly with respect to the plane of the wheel to unite them simultaneously.

5. In a wheel of the class described, a tread ring and disks forming the web of the wheel, said disks provided with tread flanges adapted to embrace the outside of the tread ring, said tread ring having an internal extending groove and the margins of the said tread flanges of the disk turned into the said groove, with a binding ring pressed into the groove and thereby locking in place the tread flanges of the disks.

6. In a wheel of the class described, a tread ring and disks forming the web of the wheel, said disks provided with tread flanges adapted to embrace the outside of the tread ring, said tread ring having a peripheral groove and the margins of the said tread flanges of the disk turned into the said groove, with a binding ring pressed into the groove and thereby locking in place the tread flanges of the disks, and the said locking ring being continuous and pressed in place by being upset to shorten its diameter.

7. In a wheel of the class described, a tread ring and disks forming the web of the wheel, said disks provided with tread flanges adapted to embrace the outside of the tread ring, said tread ring having a circumferential groove and the margins of the said tread flanges of the disks turned into the said groove, with an undivided ring filling the remaining space in the groove and locking in place the tread flanges of the disks.

8. In a wheel of the class described, disks forming the web of wheel and said disks locked to the hub by means of in-turned edges clamping into grooves in flanges of the hub by means of clamping rings pressed into the grooves, and said clamping rings locked in place.

9. In a wheel of the class described, disks forming the web of the wheel and said disks locked to the hub by means of in-turned edges clamped into grooves in flanges of the hub by means of the clamping rings pressed into the grooves, and said clamping rings locked in place by having portions of the hub swaged over, after the clamping rings are home or in place.

10. In a wheel of the class described, disks forming the web of the wheel and said disks locked to the hub by means of in-turned edges clamped into grooves in flanges of the hub by means of clamping rings pressed into the grooves, and said clamping rings locked in place by positive locking means in addition to the frictional engagement of the parts.

Signed at Chicago, in the county of Cook and State of Illinois, this tenth day of September, 1919.

WILLIAM ERASTUS WILLIAMS.

Witnesses:
    B. J. BERNHARD,
    JOHN B. JEFFERSON.